United States Patent
Andrigo et al.

(10) Patent No.: US 7,090,277 B2
(45) Date of Patent: Aug. 15, 2006

(54) GEAR DRIVE AND LINKAGE FOR POWER OPERATED SEAT ASSEMBLY

(75) Inventors: Gregory James Alexander Andrigo, Ontario (CA); Andrew William Guthrie, Ontario (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 104 days.

(21) Appl. No.: 11/014,549

(22) Filed: Dec. 16, 2004

(65) Prior Publication Data

US 2006/0131946 A1   Jun. 22, 2006

(51) Int. Cl.
    *B60N 2/02* (2006.01)
(52) U.S. Cl. .............. 296/65.08; 296/65.09; 296/65.03
(58) Field of Classification Search ............ 296/65.08, 296/65.09; 297/15, 331
    See application file for complete search history.

(56) References Cited

U.S. PATENT DOCUMENTS

| | | | | |
|---|---|---|---|---|
| 3,957,312 A | * | 5/1976 | Bonnaud ................... 297/341 |
| 5,238,285 A | * | 8/1993 | Holdampf et al. ....... 296/65.09 |
| 5,482,349 A | * | 1/1996 | Richter et al. ........... 296/65.09 |
| 6,036,252 A | * | 3/2000 | Hecksel et al. ......... 296/65.03 |
| 6,123,380 A | * | 9/2000 | Sturt et al. .............. 296/65.09 |
| 6,152,533 A | * | 11/2000 | Smuk ........................ 297/341 |
| 6,328,381 B1 | * | 12/2001 | Smuk ........................ 297/365 |
| 6,336,679 B1 | * | 1/2002 | Smuk .................... 297/378.12 |
| 6,568,736 B1 | * | 5/2003 | Jach et al. ............... 296/65.09 |
| 6,648,393 B1 | * | 11/2003 | Milnar et al. ........... 296/65.03 |
| 6,902,236 B1 | * | 6/2005 | Tame ........................ 297/331 |
| 6,974,174 B1 | * | 12/2005 | Imajo et al. ............. 296/65.08 |

FOREIGN PATENT DOCUMENTS

WO   PCT US04/05610   2/2004

* cited by examiner

*Primary Examiner*—Kiran B. Patel
(74) *Attorney, Agent, or Firm*—Kevin S. MacKenzie; Gifford, Krass; Dean B. Watson

(57) ABSTRACT

An adjustment mechanism is provided for a seat assembly of an automotive vehicle having a floor. The adjuster mechanism includes a support member, a first leg, a shaft, an arm, a link and a motor. The shaft extends defines a first axis. A first end of the support member is rotatably coupled to the shaft. The first leg has an upper end rotatably coupled to the shaft and a lower end rotatably coupled to the floor for rotation about a second axis. The arm has a distal end extending radially outwardly from the shaft. The link has one end pivotally coupled to the distal end of the arm and an opposite end pivotally coupled to the floor for rotation of the link about a third axis. A motor is drivingly engaged to the shaft via a gear mechanism causing rotation of support member about the first axis, rotation of the first leg about the second axis and rotation of the link about the third axis, whereby the support member is displaced between a seating position and a stowed position.

20 Claims, 4 Drawing Sheets

GEAR DRIVE AND LINKAGE FOR POWER OPERATED SEAT ASSEMBLY

BACKGROUND OF THE INVENTION

I. Field of the Invention

The invention relates to seat assemblies for automotive vehicles. More specifically, the invention relates to a power operated adjuster mechanism having a gear drive and linkage for moving the seat assembly between a seating position and a stowed position.

II. Description of the Related Art

Automotive vehicles, particularly sport utility vehicles or vans, include multiple rows of seat assemblies for supporting occupants in a seating position above a floor in the vehicle. It is widely known to provide mechanisms allowing the rear seat assemblies to be removed from the vehicle to increase the cargo carrying capacity of the vehicle. It is also known to provide adjuster mechanisms allowing articulation of the rear seat assemblies between the seating position and a stowed position to increase the cargo carrying capacity of the vehicle without the need to remove the seat assemblies from the vehicle.

Most recently, automotive vehicles have been provided with seat assemblies having adjuster mechanisms allowing movement of the seat assemblies between the seating position and a stowed position disposed within a recess in the floor. The third row seat assemblies in such vehicles as the 2004 Honda Odyssey and Chrysler Minivan, for example, are movable between the seating position and a stowed position disposed in a recess behind the third row.

It remains desirable to provide a powered adjuster mechanism for automatically moving a seat assembly between a seating position and a stowed position within a recess in vehicle floor.

SUMMARY OF THE INVENTION

According to one aspect of the invention, an adjustment mechanism is provided for a seat assembly of an automotive vehicle having a floor. The adjuster mechanism includes a support member, a first leg, a shaft, an arm, a link and a motor. The shaft extends longitudinally along a first axis. The support member has opposite first and second ends. The first end is rotatably coupled to the shaft. The first leg has an upper end rotatably coupled to the shaft. The first leg has a lower end rotatably coupled to the floor of the vehicle for rotation about a second axis. The arm has a distal end extending radially outwardly from the shaft. The link has one end pivotally coupled to the distal end of the arm and an opposite end pivotally coupled to the floor for rotation of the link about a third axis. The motor is fixedly secured to the support member. The motor has an output shaft through which the motor provides a torsional output. A gear mechanism is operatively coupled between the output shaft of the motor and the shaft such that the motor rotatably drives the shaft to cause rotation of support member about the first axis, rotation of the first leg about the second axis and rotation of the link about the third axis; whereby the support member is displaced between a seating position spaced above the floor and a stowed position disposed along the floor.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
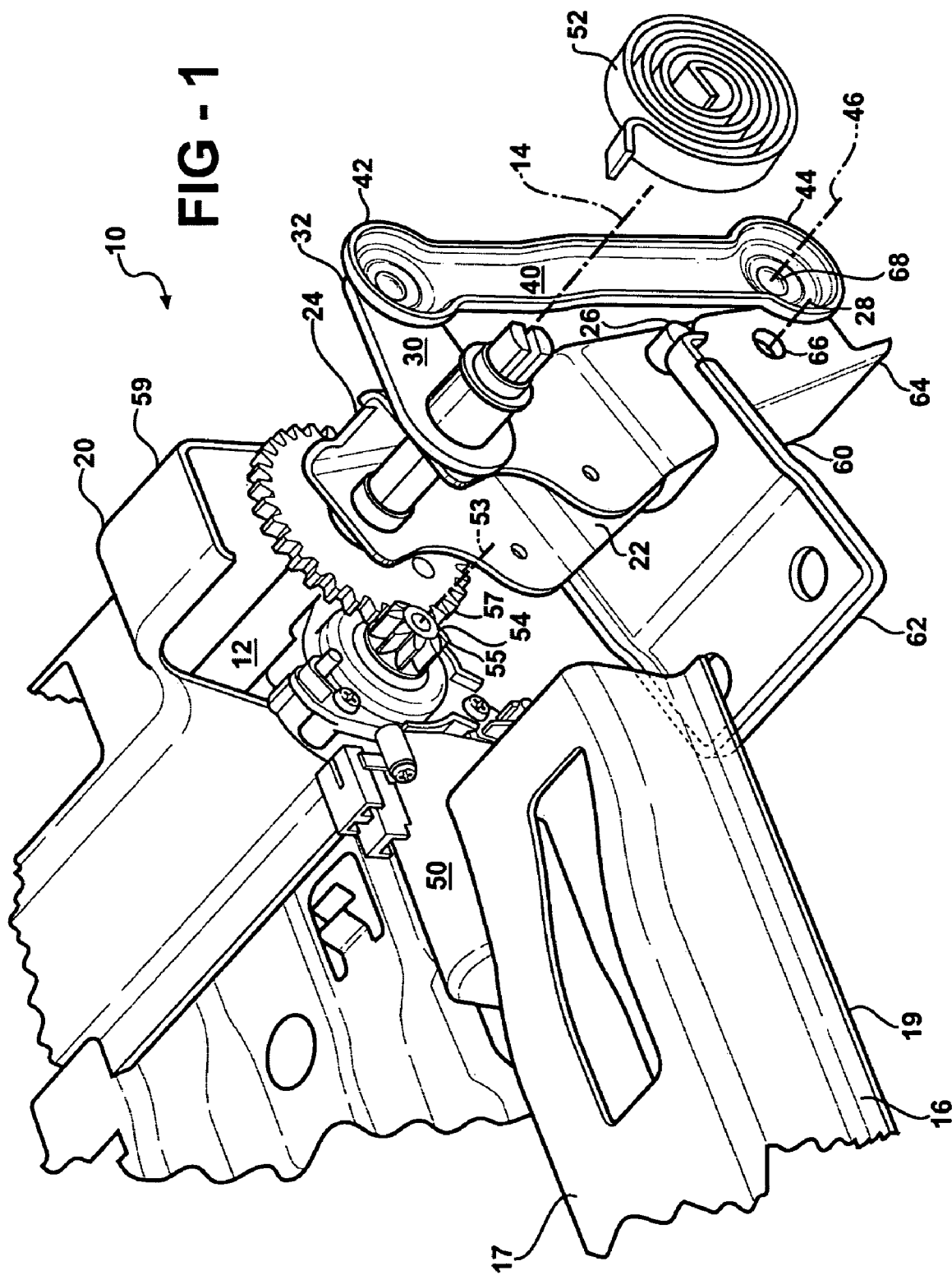
FIG. 1 is an enlarged perspective view of an adjuster mechanism according to one embodiment of the invention.

Automotive vehicles include seat assemblies for supporting occupants in a seating position above a floor in the vehicle. One embodiment of the present invention provides an adjustment mechanism allowing selective articulation of the seat assembly between the seating position and a stowed position disposed along the floor or within a recess formed in the floor of the vehicle.

Referring to FIGS. 1–4, the adjuster mechanism is generally indicated at 10. The adjuster mechanism includes a shaft 12 extending longitudinally along a first axis 14. A support member 16 extends between a first end 18 and second end 20. The support member 16 has an upper surface 17 and an opposite bottom surface 19. The first end 18 of the support member 16 is rotatably coupled to the shaft 12. A first leg 22 extends between an upper end 24 and a lower end 26. The upper end 24 is rotatably coupled to the shaft 12. The lower end 26 is rotatably coupled to the floor of the vehicle for rotation about a second axis 28. An arm 30 is fixedly secured to the shaft 12. The arm 30 has a distal end 32 extending radially outwardly from the shaft 12.

The adjuster mechanism 10 also includes a link 40. The link 40 has an upper end 42 pivotally coupled to the distal end 32 of the arm 30 and an opposite lower end 44 pivotally coupled to the floor for rotation about a third axis 46.

A reversible motor 50 is fixedly secured to the support member 16. The motor 50 is drivingly engaged to the shaft 12 via a gear mechanism 54. More specifically, the gear mechanism 54 includes a motor 50, a first gear 55 and a second gear 57. The motor 50 provides a rotary output via an output shaft 51 extending longitudinally along a fourth axis 53. The fourth axis 53 is radially offset with respect to the first axis 14 defined by the shaft 12. The first gear 55 is preferably a pinion gear fixedly secured to an end of the output shaft 51. The second gear 57 is preferably a spur gear fixedly secured to the shaft 12. The second gear 57 is disposed between the seat cushion 20 and the first leg 22 and is positioned axially along the shaft 12 for driving engagement with the first gear 55. Preferably, the second gear 57 has at least one more tooth than the first gear 55 to reduce rotation of the shaft 12 relative to the output shaft 51. It should, however, be appreciated that the first gear 55 and second gear 57 can have any ratio of teeth suitable to the application. Alternatively, the first gear 55 could be a worm gear allowing the motor 50 to be positioned along an axis substantially parallel with the shaft 12, rather than normal to the shaft 12 as shown in the figures. Thus, the gear mechanism 54 provides driving engagement between the motor 50 and the shaft 12 and provides packaging flexibility for the motor 50 depending on the types of gears used for the first 55 and second 57 gears.

Preferably, the support member 20 includes a stamped member defining a housing 59 substantially covering the gear mechanism 54.

Figure 2:
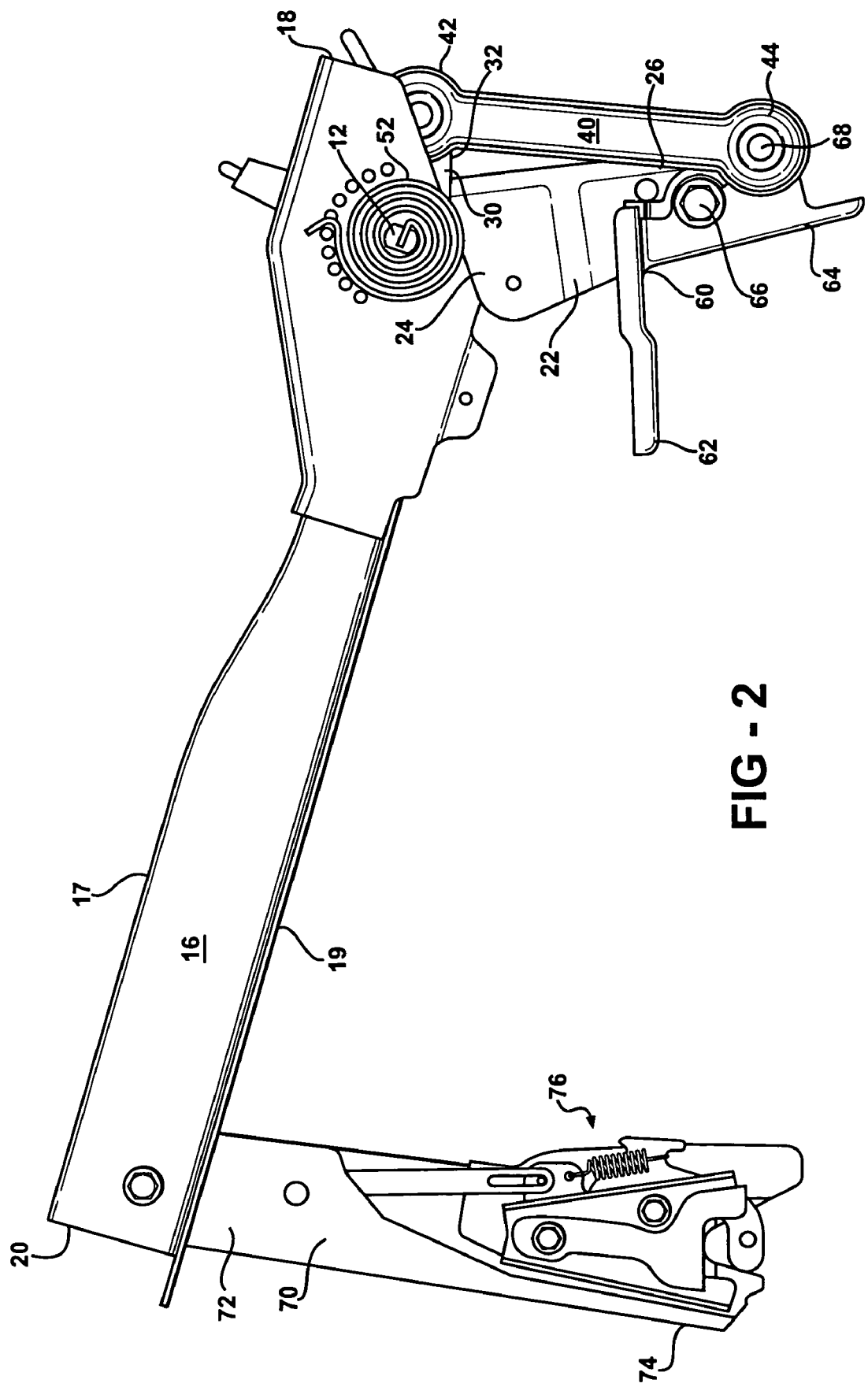
FIG. 2 is a side elevational view of the adjuster mechanism of FIG. 1 in a seating position.
Figure 3:
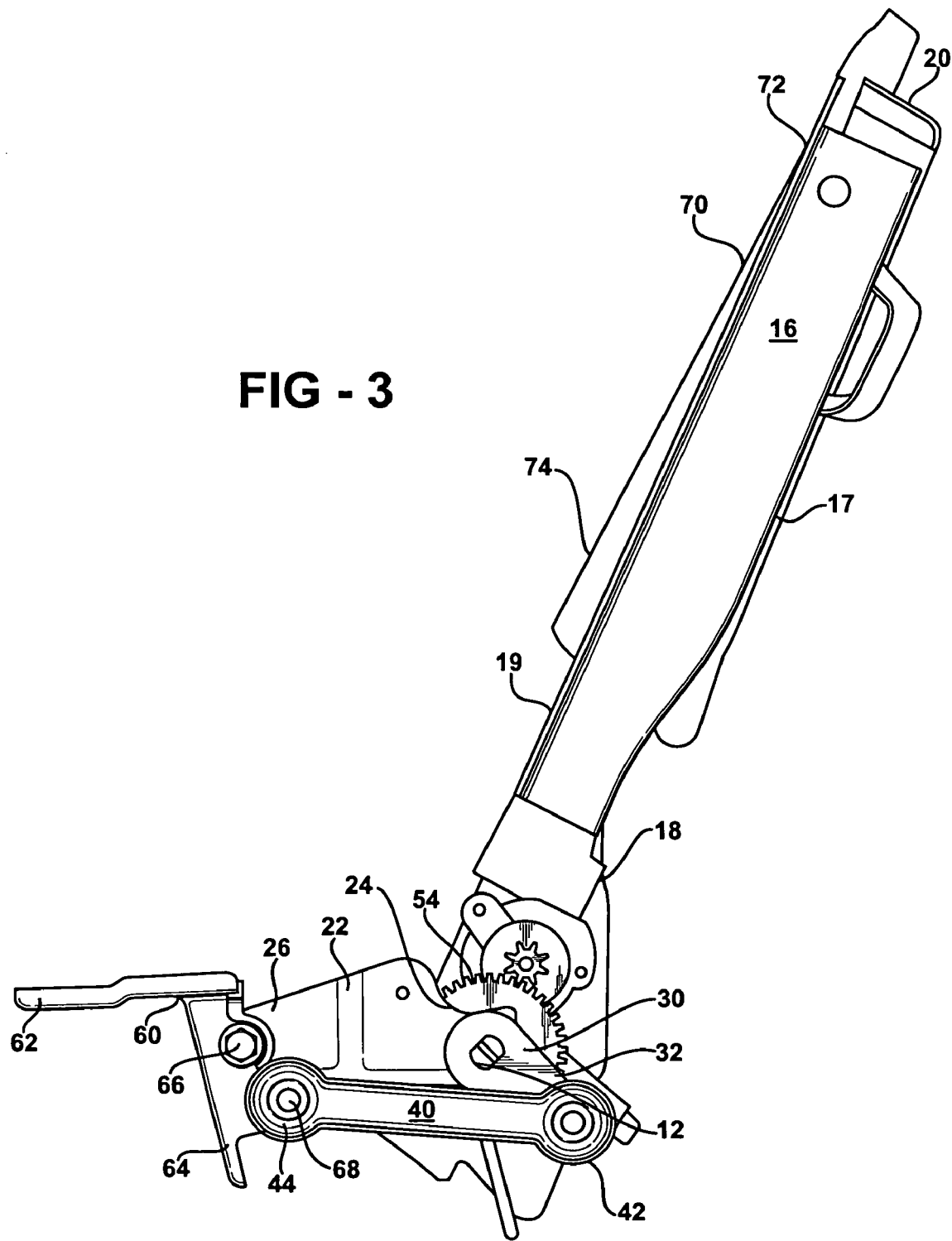
FIG. 3 is a side elevational view of the adjuster mechanism of FIG. 1 in an intermediate position between the seating position and a stowed position.
Figure 4:
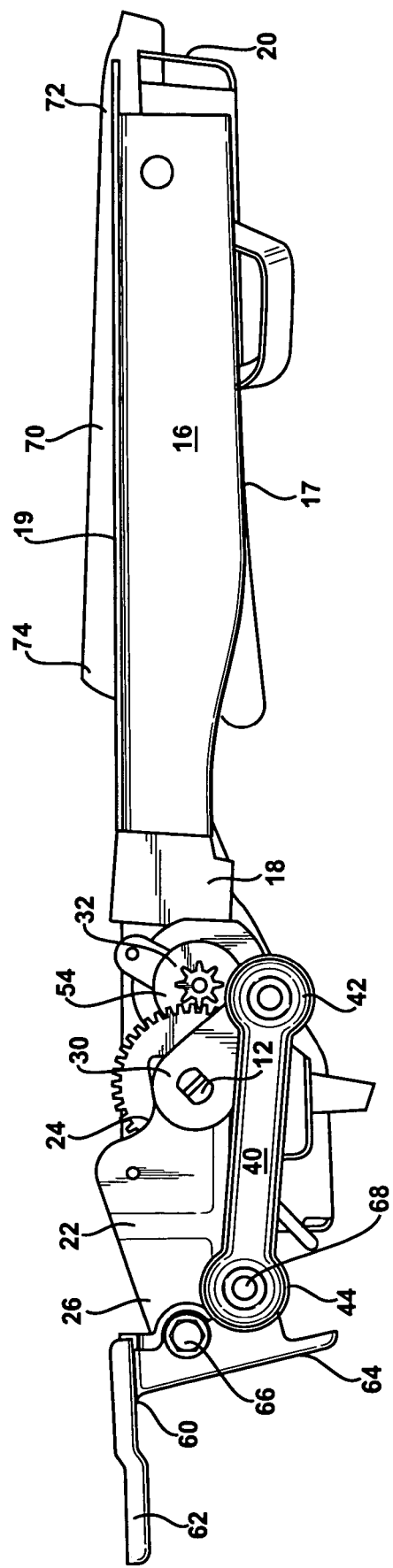
FIG. 4 is a side elevational view of the adjuster mechanism of FIG. 1 in the stowed position.

The motor 50 drives the shaft 12 via the gear mechanism 54 to cause rotation of the support member 16 about the first axis 14 relative to the first leg 22; rotation of the first leg 22 about the second axis 28; and rotation of the link 40 about the third axis 46. By this arrangement, the support member 16 is movable by the motor 50 between the seating position, as shown in FIG. 2, the stowed position, as shown in FIG. 4, and any one of a plurality of intermediate positions therebetween, as shown in FIG. 3. The motor 50 is powered by the battery in the vehicle and activated by conventional switches located on the seat assembly or in the vehicle.

Preferably, a biasing member 52 is energized between the shaft 12 and the support member 16. The biasing member 52 continuously biases the support member 16 toward the seating position, or in a counterclockwise direction as viewed in the figures. Most preferably, the biasing member 52 is a steel clock spring.

A floor bracket 60 is provided for rotatably coupling the first leg 22 and the link 40 to the floor of the vehicle. The floor bracket 60 is fixedly secured to the floor by conventional methods, such as bolting. The floor bracket 60 includes an upper portion 62 and a lower portion 64. The upper portion 62 extends horizontally along the floor of the vehicle. The lower portion 64 extends orthogonally from the upper portion 62 and into the recess along a generally upright wall defining a side of the recess. A pin 66 defines the second axis 28 and rotatably couples the lower end 26 of the first leg 22 to the lower portion 64 of the floor bracket 60 for rotation of the first leg 22 thereabout. Similarly, a pin 68 defines the third axis 46 and rotatably couples the lower end 44 of the link 40 to the lower portion 64 of the floor bracket 60 for rotation of the link 40 thereabout. The second 28 and third 46 axes are generally parallel. The third axis 46 is spaced below the second axis 28.

The adjuster mechanism 10 includes a second leg 70 extending between an upper end 72 and a lower end 74. The upper end 72 of the second leg 70 is rotatably coupled to the second end 20 of the support member 16 for rotation relative to the support member 16 between a support position and a retracted position. In the support position, the second leg 70 supports the first end 18 spaced above the floor when the support member 16 is in the seating position. In the retracted position, the second leg 70 is disposed along the bottom surface 19 of the support member 16. The second leg 70 is operatively coupled by a linkage (not shown) to the first leg 22 for movement of the second leg 70 between the support and retracted positions in response to movement of the support member 16 between the seating and stowed positions, respectively. The linkage can be in the form of a bowden cable, rigid link, or the like.

The lower end 74 of the second leg 70 also includes a latching mechanism 76. The latching mechanism 76 is selectively lockingly engagable with floor pins fixedly secured to the floor of the vehicle. The latching mechanism 76 locks the lower end 74 of the second leg 70 to floor while in the extended position. Thus, the latching mechanism 76 must first be unlocked from the floor pins prior to articulation of the support member 16 between the seating and stowed positions. The latching mechanism 76 can be of any suitable design known by those having ordinary skill in the art. The latching mechanism 76 is actuated by conventional release handles located on the seat assembly.

While the foregoing description discloses only one side of the adjuster mechanism 10, it should be appreciated that a preferred embodiment of the adjuster mechanism 10 includes symmetrically opposite pairs of first legs 22, second legs 70, links 40, arms 30 and floor brackets 60. The first legs 22 and second legs 70 define a four-bar linkage extending between the support member 16 in the seating position and the floor of the vehicle. More specifically, the upper ends 24 of both first legs 22 are pivotally coupled to the first end 18 of the support member 16 by the shaft 12. The lower ends 26 of both first legs 22 are rotatably coupled to respective floor brackets 60 for movement about the second axis 28. The upper ends 42 of both links 40 are rotatably coupled to respective arms 30 disposed at opposite ends of the shaft 12. The lower ends 44 of both links 40 are rotatably coupled to respective floor brackets 60 for movement about the third axis 46. The upper ends 72 of both second legs 70 are rotatably coupled to the second end 20 of the support member 16, preferably by a common pin 80.

In use, adjuster mechanism 16 is coupled to a seat assembly having a seat cushion and a seat back. Specifically, the upper surface 17 of the support member 16 is fixedly secured to a bottom surface of the seat cushion by bolts or the like. The seat assembly with the adjuster mechanism 16 is assembled to the vehicle by fixedly securing the floor brackets 60 to the floor of the vehicle. The support member 16 is positioned in the seating position, as shown in FIG. 2. The latching mechanisms 76 are locked to the floor pins.

To move the seat assembly between the seating position and the stowed position, the seat back is first moved from an upright seating position to a forwardly folded position disposed horizontally along the seat cushion. Typically, the seat back is moved between the upright and folded positions by a conventional motor powered recliner mechanism. Optionally, the powered movements of the seat back and the adjuster mechanism 10 can be coordinated by a control module (not shown) such that the seat back is automatically folded to the folded position as the adjuster mechanism is moved toward the stowed position.

The latching mechanisms 76 are then unlocked from the floor pins. The motor 50 is activated via the seat or vehicle mounted switch. The motor 50 rotatably drives the shaft 12 in a clockwise direction, as viewed in the figures. The arms 30 rotate with the shaft 12 about the first axis 14 causing generally simultaneous clockwise rotation of the first leg 22 about the second axis 28 and the link 40 about the third axis 46.

The first leg 22 and the link 40 reach the end of their clockwise travel, as the support member 16 reaches an intermediate position shown in FIG. 3. Continued operation of the motor 50 is then fully directed toward continued movement of the support member 16 from the intermediate position and the stowed position shown in FIG. 4. Upon reaching the stowed position, the entire seat assembly including the adjuster mechanism 10 is disposed within the recess in the floor of the vehicle. The seat assembly and adjuster mechanism 10 can be returned to the seating position by reversing the above-described operation.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. An adjustment mechanism for a seat assembly of an automotive vehicle, wherein the vehicle includes a floor, said adjustment mechanism comprising:

a shaft extending longitudinally along a first axis;

a support member having opposite first and second ends, said first end being rotatably coupled to said shaft;

a first leg having an upper end rotatably coupled to said shaft, said first leg having a lower end rotatably coupled to the floor of the vehicle for rotation about a second axis;

an arm having a distal end extending radially outwardly from said shaft;

a link having an upper end pivotally coupled to said distal end of said arm and an opposite lower end pivotally coupled to the floor for rotation of said link about a third axis;

a motor fixedly secured to said support member; said motor having an output shaft through which said motor provides a torsional output;

a gear mechanism operatively coupled between the output shaft of said motor and said shaft such that said motor rotatably drives said shaft to cause rotation of support member about said first axis, rotation of said first leg about said second axis and rotation of said link about said third axis; whereby said support member is displaced between a seating position spaced above the floor and a stowed position disposed along the floor.

2. An adjustment mechanism as set forth in claim 1 including a floor bracket coupled to both said first leg and said link, said floor bracket adapted to be fixedly secured to the floor of the vehicle.

3. An adjustment mechanism as set forth in claim 2, wherein said floor bracket includes an upper portion and a lower portion, said lower portion extending orthogonally from said upper portion.

4. An adjustment mechanism as set forth in claim 3, wherein said lower end of said first leg is rotatably coupled to said lower portion of said floor bracket for movement about said second axis.

5. An adjustment mechanism as set forth in claim 4, wherein said lower end of said link is rotatably coupled to said lower portion of said floor bracket for movement about said third axis.

6. An adjustment mechanism as set forth in claim 1, wherein said second and third axes are generally parallel, said third axis being spaced below said second axis.

7. An adjustment mechanism as set forth in claim 1 including a second leg having an upper end rotatably coupled to said second end of said support member for movement between an extended position extending outwardly from said support member and a retracted position disposed along said support member.

8. An adjustment mechanism as set forth in claim 7, wherein said second leg is operatively coupled to said first leg such that said second leg is displaced between said extended and retracted positions in response to movement of said support member between said seating and stowed positions, respectively.

9. An adjustment mechanism as set forth in claim 7 including a pair of said first legs and a pair of said second legs defining a four bar linkage supporting said support member in said seating position.

10. An adjustment mechanism as set forth in claim 9, wherein said first legs are rotatably coupled to said shaft for movement about said first axis.

11. An adjustment mechanism as set forth in claim 10 including a pair of said floor brackets pivotally interconnecting said lower ends of respective first legs to the floor of the vehicle.

12. An adjustment mechanism as set forth in claim 11 including a pair of said arms extending radially outwardly from opposite ends of said shaft.

13. An adjustment mechanism as set forth in claim 12 including a pair of said links, said upper ends of said pair of said links being rotatably coupled to respective arms, said lower ends of said pair of said link being rotatably coupled to respective floor brackets for movement about said third axis.

14. An adjustment mechanism as set forth in claim 9, wherein said upper ends of said second legs are fixedly secured to a common pivot pin rotatably coupled to said second end of said support member, so as to be displaced together between said extended and retracted positions in response to movement of said support member between said seating and stowed positions, respectively.

15. An adjustment mechanism as set forth in claim 1 being movable to an intermediate position between said seating and stowed positions, wherein said first leg and said link reach the end of their respective movements about said second and third axes, and whereafter continued operation of said motor is fully directed toward displacement of said support member between said intermediate and said stowed positions.

16. An adjustment mechanism as set forth in claim 1, wherein said gear mechanism includes a first gear fixedly secured to said output shaft of said motor.

17. An adjustment mechanism as set forth in claim 16, wherein said gear mechanism includes a second gear fixedly secured to said shaft, said second gear being drivingly engaged with said first gear.

18. An adjustment mechanism as set forth in claim 16, wherein said first gear is a pinion gear.

19. An adjustment mechanism as set forth in claim 17, wherein said second gear is a spur gear.

20. An adjustment mechanism as set forth in claim 1, wherein said output shaft of said motor defines a fourth axis that is generally parallel and spaced apart from said first axis.

\* \* \* \* \*